(12) United States Patent
Yip et al.

(10) Patent No.: US 7,054,097 B1
(45) Date of Patent: May 30, 2006

(54) TAPE GUIDING TECHNIQUES FOR A DUAL ACTUATOR READ-WHILE-WRITE RECORDING SYSTEM

(75) Inventors: Yung Yip, Afton, MN (US); Douglas W. Johnson, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 11/083,771

(22) Filed: Mar. 18, 2005

(51) Int. Cl.
G11B 5/584 (2006.01)
G11B 5/09 (2006.01)
G11B 17/00 (2006.01)

(52) U.S. Cl. .................. 360/77.12; 360/53; 360/71
(58) Field of Classification Search .................. None
See application file for complete search history.

(56) References Cited

U.S. PATENT DOCUMENTS

| 5,432,652 | A | * | 7/1995 | Comeaux et al. ......... 360/77.12 |
| 5,893,526 | A | | 4/1999 | Zwettler |
| 6,081,402 | A | * | 6/2000 | Cho .......................... 360/77.04 |
| 6,137,659 | A | * | 10/2000 | Warmenhoven .......... 360/261.1 |
| 6,343,757 | B1 | | 2/2002 | Zwettler |
| 6,353,514 | B1 | | 3/2002 | Rambosek et al. |
| 6,563,670 | B1 | | 5/2003 | Brong et al. |
| 6,644,581 | B1 | | 11/2003 | Plourde et al. |
| 6,771,456 | B1 | * | 8/2004 | Winarski et al. ......... 360/78.02 |
| 2003/0227702 | A1 | * | 12/2003 | Watson et al. ................ 360/53 |
| 2005/0094308 | A1 | * | 5/2005 | Mahnad et al. .......... 360/77.12 |

OTHER PUBLICATIONS

Co-pending U.S. Appl. No. 10/912,893, filed Aug. 5, 2004, Johnson et al.; entitled "Guide Arrangements for Data Strorage Tape Guiding Systems".
Co-pending U.S. Appl. No. 10/914,032, filed Aug. 5, 2004, Johnson et al., entitled "Data Storage Tape Guiding Systems Using Tapered Guides".
Co-pending U.S. Appl. No. 11/012,795, filed Dec. 14, 2004, Anderson et al., entitled "Dual Actuators for Read-While-Write Recording System".

* cited by examiner

*Primary Examiner*—Andrew L. Sniezek
(74) *Attorney, Agent, or Firm*—Eric D. Levinson

(57) ABSTRACT

The invention provides a read-while-write recording system for a linear data storage medium, such as magnetic tape or other data storage medium in which data is stored on parallel data tracks that extend along a length of the medium. The invention makes use of separate sliders for the read and write elements, and separate actuators to control the positioning of the sliders. Each of the sliders may also include servo elements to read servo marks. In order to limit the effect of movement of the first slider on the positioning of the second slider, a tape guide is implemented between the different sliders.

19 Claims, 12 Drawing Sheets

US 7,054,097 B1

TAPE GUIDING TECHNIQUES FOR A DUAL ACTUATOR READ-WHILE-WRITE RECORDING SYSTEM

TECHNICAL FIELD

The invention relates to linear data storage media such as magnetic tape and, more particularly, to techniques for guiding the linear data storage media over heads for reading and writing data to the linear data storage media.

BACKGROUND

Linear data storage media refers to data storage media, such as magnetic tape, in which data is stored in parallel tracks that extend linearly along the length of the media. Examples of linear data storage media include magnetic tape, magneto-optic tape, optical tape, holographic tape, and possibly other tape-like media formats. Magnetic tape media remains economical for storing large amounts of data. For example, magnetic tape cartridges or large spools of magnetic tape are often used to back up large amounts of data for large computing centers. Magnetic tape cartridges also find application in the backup of data stored on smaller computers such as workstations, desktop or laptop computers.

In magnetic tape, data is typically stored as magnetic signals that are magnetically recorded on the medium surface. The data stored on the magnetic tape is often organized along data tracks, and read/write heads are positioned relative to the data tracks to write data to the tracks or to read data from the tracks. As the number of data tracks increases, the data storage capacity of the magnetic tape likewise increases. However, as the number of data tracks increases, the tracks become narrower and more crowded on the surface of the data storage tape. Servo tracks are also commonly defined on magnetic media to provide reference points for tracking the location of data tracks. Servo tracks can improve the ability to locate data tracks, particularly as the tracks become narrower and more crowded on the surface of the data storage tape.

A wide variety of heads have been designed to write data to magnetic tape. Various heads have also been designed to read data stored on magnetic tape. A magnetic data tape recording system often includes both write heads and read heads to facilitate the writing of information to the magnetic medium and readout of such information for verification that the data was written properly. Read-while-write sliders, for example, typically include a read head and a write head precisely fabricated on a slider to facilitate readout and verification of data written by the write head.

SUMMARY

In general, the invention provides a read-while-write recording system for a linear data storage medium, such as magnetic tape or other data storage medium in which data is stored on parallel data tracks that extend along a length of the medium. The invention makes use of separate sliders for the read and write elements, and separate actuators to control the positioning of the sliders. Each of the sliders may also include servo elements to read servo marks. In this manner, the write elements of a first slider can be positioned independently from the read elements of a second slider in order to achieve improved head positioning with respect to data tracks on the linear data storage medium. Moreover, in order to limit the effect of movement of the first slider on the positioning of the second slider, a tape guide is implemented between the two sliders.

The invention can avoid problems with conventional read-while-write sliders that include both the read and write elements. These problems generally manifest in the conventional sliders at very small track pitches, such as track pitches less than 5 microns, less than 2 microns and especially less than 1 micron. Various tape guiding techniques are also described which can improve the performance of a dual actuator system. Specifically, the invention makes use of tape guiding techniques that reduce actuator induced tape motion from the different slider/actuator assemblies.

In one embodiment, the invention provides a read-while-write recording system for a linear data storage medium. The system may comprise a first slider including a write element to write data to the linear data storage medium and a first servo element to read servo marks from the linear data storage medium, and a first actuator to define positioning of the first slider. The system may also comprise a second slider including a read element to read the data written by the write element, and a second servo element to read the servo marks from the linear data storage medium, and a second actuator to define positioning of the second slider. A guide is included between the first slider and the second slider to limit the effect of movement of the first slider on the positioning of the second slider.

In another embodiment, the invention provides a read-while-write recording system for magnetic data storage tape comprising a first slider including a first write element to write data to the magnetic tape in a first tape direction, a first read element to read data from the magnetic tape in a second tape direction, and a first servo element to read servo marks from the magnetic tape; a first actuator to define positioning of the first slider; a second slider including a second write element to write data to the magnetic tape in the second tape direction, a second read element to read data from the magnetic tape in the first tape direction, and a second servo element to read servo marks from the magnetic tape; a second actuator to define positioning of the second slider; and a guide between the first slider and the second slider.

In another embodiment, the invention provides a method comprising guiding a linear data storage medium through a set of guides past a write element on a first slider and a read element on a second slider, the set of guides including a guide between the first slider and the second slider; writing data on the linear data storage medium via the write element on the first slider; verifying the data on the linear data storage medium via the read element on the second slider; positioning the write element of the first slider via a first actuator in response to servo signals detected by a first servo element on the first slider; and positioning the read element of the second slider via a second actuator in response to servo signals detected by a second servo element on the second slider.

The various embodiments of the invention may be capable of providing one or more advantages. Specifically, the invention can improve head to track alignment of read heads and write heads. By implementing separate sliders and separate actuators for the read and write heads, the invention can avoid alignment problems with conventional read-while-write sliders that manifest at very small track pitches, such as track pitches less than 5 microns, less than 2 microns and especially less than 1 micron. In some embodiments, the invention can allow for bi-directional read-while-write capabilities with the improved head to track alignment. Moreover, in order to limit the effect of movement of the first slider on the positioning of the second slider, a tape guide is implemented between the two sliders. The different sliders/actuator assemblies may also be mounted on shock mounts, rather than being directly mounted to a baseplate, in order to reduce unintended motion between the actuators through the baseplate.

Various bi-directional slider arrangements are disclosed, including an arrangement in which each slider includes both write elements and read elements. In that case, however, in accordance with the invention, the write elements of a given slider are used for writing in one direction and the read elements of the slider are used for verification in the other direction. Thus, in each direction, the set of read elements and write elements that are used reside on different sliders, which are controlled by different actuators. These embodiments having write elements and read elements on each slider can provide manufacturing advantages by allowing conventional manufacturing techniques to be used in the creation of the sliders that are used to implement the invention. In any case, implementing a guide between the two sliders improves system performance by better isolating the medium with respect to the sliders such that motion of one slider does not substantially affect the position of the medium with respect to the other slider. In most of the embodiments described herein, the different sliders may be positioned on a common side of the medium, however, in alternative embodiments the different sliders may be positioned on opposing sides of the medium, e.g., if the medium is recordable on both sides. In other words, the guiding arrangements described herein may have additional use for dual slider arrangements in which different sliders are positioned to read or write to different sides of a medium.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
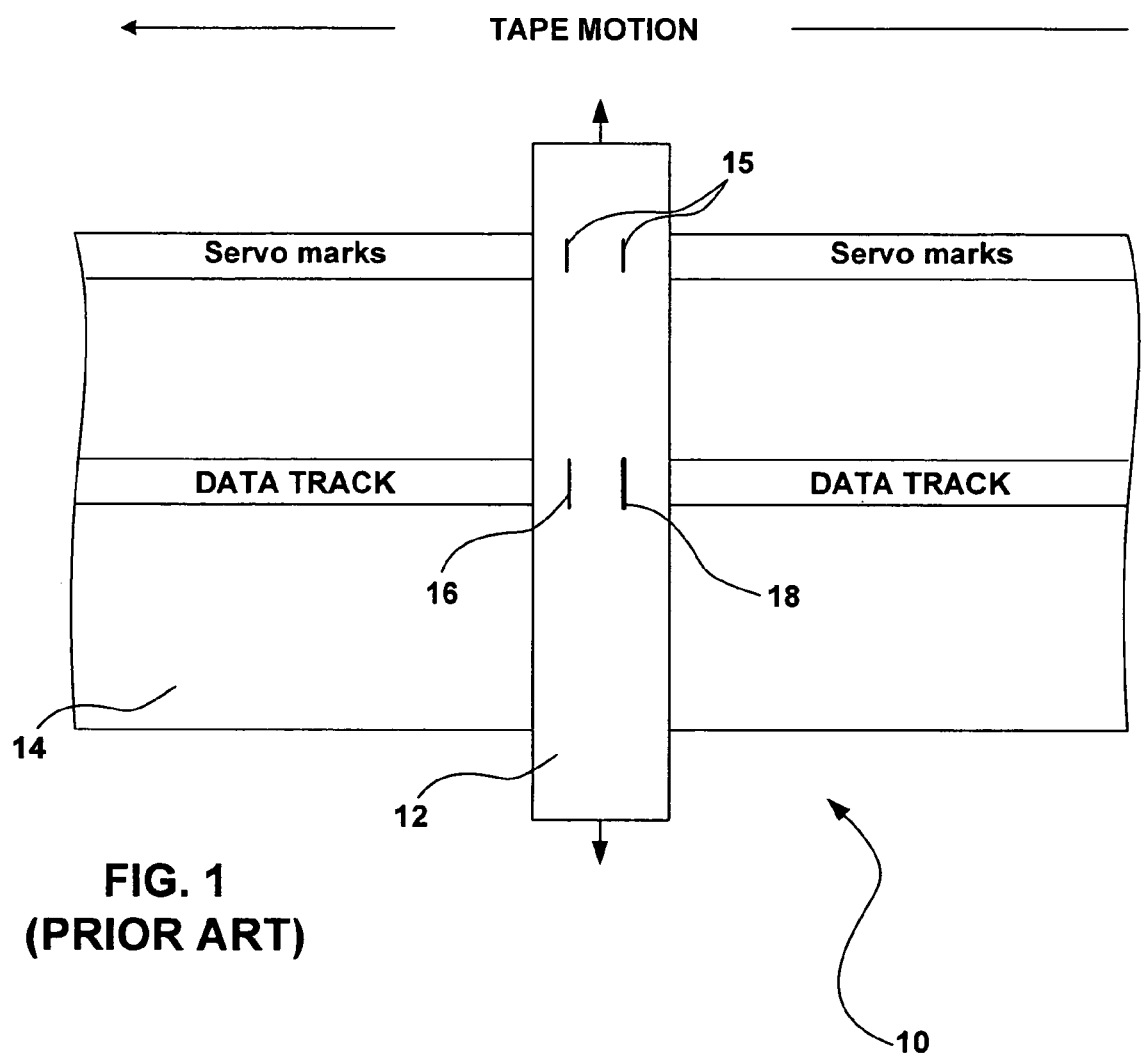
FIG. 1 is a conceptual diagram illustrating a conventional read-while-write slider positioned over a linear data storage medium.

The invention provides a read-while-write recording system for a linear data storage medium. A linear data storage medium refers to a medium in which data is stored on parallel data tracks that extend along a length of the medium. Examples of linear data storage media include magnetic tape, magneto-optic tape, optical tape, holographic tape, and possibly other tape-like media formats. It is highly desirable to increase the data storage density of linear data storage medium, and this often entails reducing the track pitch between adjacent data tracks such that a larger number of data tracks can be recorded in a given area.

Conventional read-while-write systems for magnetic tape make use of sliders that include read elements and write elements. The read elements are precisely aligned with the write elements on the slider for every channel of the slider, such that for each channel, a write element can write data to magnetic tape and a read element can read the data to verify that it was properly recorded. The slider may also include a servo element to read servo marks of the medium. An actuator can position the slider in response to the detected servo signals in order to properly align the write and read elements with respect to data tracks of the magnetic tape.

As track pitches become smaller, however, it becomes increasingly more difficult to align the write elements with the read elements on a slider. At very small track pitches, such as track pitches less than 5 microns, alignment becomes particularly difficult. As track pitches become less than 2 micron or less than 1 micron, alignment of read elements with write elements on a slider may be extremely difficult, or even impossible, particularly for mass-produced read elements. Very slight tilt of the slider can cause misalignment with respect to data tracks at these very small track pitches. Also, thermodynamics can cause expansion of the medium or the head, which can also cause misalignment problems at these small track pitches. Media stretching or width variations can further compound such problems.

In order to address these alignment concerns, the invention proposes the use of separate sliders for the read elements and the write elements of a read-while-write system. Separate servo tracking can then be performed for each slider, and each slider can be controlled by its own actuator. This avoids the need to precisely align the read element of a given channel with the write element of the given channel, as alignment of the write elements with respect to the data tracks can be performed by servo tracking of the first slider and alignment of the read elements with respect to the data tracks can be performed by servo tracking of the second slider. Moreover, in order to limit the effect of movement of the first slider on the positioning of the second slider, a tape guide is implemented between the two sliders. In particular, by incorporating a guide between the two sliders, the system performance can be improved by better isolating the medium with respect to the sliders such that motion of one slider does not substantially affect the position of the medium with respect to the other slider.

FIG. 1 is a conceptual diagram illustrating a conventional system 10 comprising a conventional read-while-write slider 12 positioned over a linear data storage medium 14. The term "slider" refers to a structure that includes one or more elements for reading or writing data to linear data storage media. Sliders can provide an air bearing surface or a contact surface that interfaces with a linear data storage medium, such as magnetic tape, to properly position read or write elements with respect to the medium surface.

Slider 12 of conventional read-while-write system 10 comprises a read element 16 and a write element 18. Importantly, read element 16 is precisely aligned with write element 18 on slider 12 such that write element 18 can write data to magnetic tape 14 and read element 16 can then read the data to verify that it was properly recorded. Conventional slider 12 may also include one or more servo elements 15 to read servo marks of medium 14. An actuator (not shown in FIG. 1) positions slider 12 in response to the detected servo signals in order to properly align write element 18 and read element 16 with respect to data tracks of medium 14.

As mentioned above, however, as track pitches become smaller, it becomes increasingly more difficult to align the write elements with the read elements on a slider. In order to address these alignment concerns, the invention proposes the use of separate sliders for the read and write elements of a read-while-write system.

Figure 2:
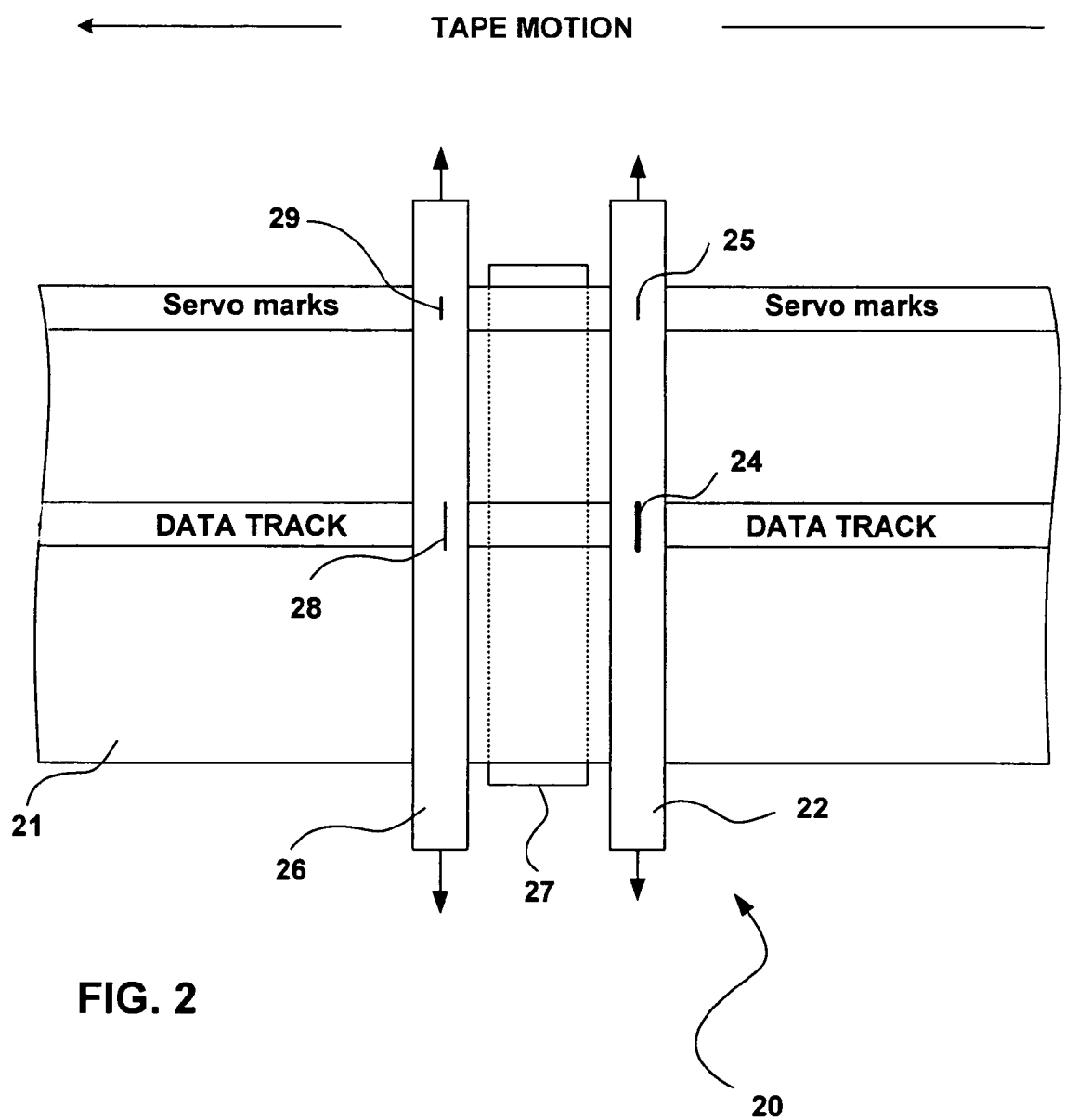
FIG. 2 is a conceptual diagram illustrating a read-while-write system that includes separate sliders for read elements and the write elements and a guide between the separate sliders.

FIG. 2 is a conceptual diagram illustrating a read-while-write system 20 that includes separate sliders for read elements and write elements, in accordance with an embodiment of the invention. In particular, a first slider 22 includes a write element 24 and a servo element 25, whereas a second slider 26 includes a read element 28 and a servo element 29. As illustrated, as medium 21 moves past sliders 22, 26 from right-to-left, write element 24 writes data into the data track of medium 21, e.g., as magnetic transitions. Read element 28 of second slider 26 reads the data written by write element 24 in order to verify the accuracy and integrity of the data. If data is not properly recorded, read element 28 can detect the inaccurate data and write element 24 can re-write the data again, e.g., at another location along medium 21. In this manner, system 20 provides read-while-write functionality.

A guide 27 is implemented between sliders 22 and 26 to guide medium 21 past sliders 22, 26. Guide 27 may be located on an opposing side of medium 21 relative to sliders 22 and 26, which can also help define the proper contact tension between sliders 22, 26 and medium 21. By implementing guide 27 between sliders 22, 26, the performance of system 20 can be improved by better isolating medium 21 with respect to sliders 22, 26 such that motion of one slider does not substantially affect the position of the medium 21 with respect to the other slider.

First slider 22 and second slider 26 are separately controllable by different actuators (not shown in FIG. 2). In particular, first slider 22 can be controlled in response to servo signals detected by servo element 25, whereas second slider 26 can be controlled in response to servo signals detected by servo element 29. Such separate control of the positioning of write element 24 and read element 28 can improve head to track alignment. In particular, with separate positioning control, write element 24 and read element 28 can be positioned more accurately with respect to data track 27. Separate positioning control can also simplify the creation of a read-while-write system by avoiding the need to precisely align read heads with write heads on a given slider, as is the case for system 10 of FIG. 1.

However, when one slider moves in response to the servo signals, the motion of that slider can shift medium 21 slightly because of friction between that slider and medium. When this occurs, the other slider may be misaligned with respect to medium. Guide 27, however, limits this cross-feed motion of medium 21 that is otherwise caused by motion of the respective sliders. In other words, guide 27 isolates actuator induced tape motion from the different sliders.

Guide 27 may comprise a generally cylindrical shaped center which forms a tape path surface and disk-shaped flanges adjacent to the cylindrical center. However, other shapes could also be used. Guide 27 may comprise polished steel or any other material. Guide 27 may comprise a hydrodynamic air bearing guide, in which case medium 21 "flies" over the tape path surface of guide 27 and the motion of medium 21 creates an air barrier between guide 27 and medium 21. Alternatively, guide 27 may comprise a hydrostatic air bearing guide, in which case medium 21 "flies" over guide 27, but the air is introduced by an external source to create the air barrier between guide 27 and medium 21. In still other examples, guide 27 may comprise a roller bearing, in which case, the tape path surfaces of guide 27 comprises a roller that rolls with medium 21 as medium 21 feeds over guides 27.

In general, read element 28 and write element 24 may comprise magnetic heads that define magnetic gaps for readout or recording, respectively. A wide variety of such heads have been developed for such read and/or write functionality, including magneto-resistive (MR) heads, giant magneto-resistive (gMR) heads, inductive heads, thin film heads, C-core heads that include an excitation coil around the C-core, and a wide variety of other types of heads. In general, a write element refers to an element or head that can write data, and a read element refers to an element or head that can read data written by the write element, e.g., for verification. Some heads can both read and write data and could be used as either a read element or a write element, while other types of heads are only suited for reading or writing. A servo element is a more specific type of read element, designed specifically to read servo marks, e.g., of a time-based or amplitude-based servo pattern.

Figure 3:
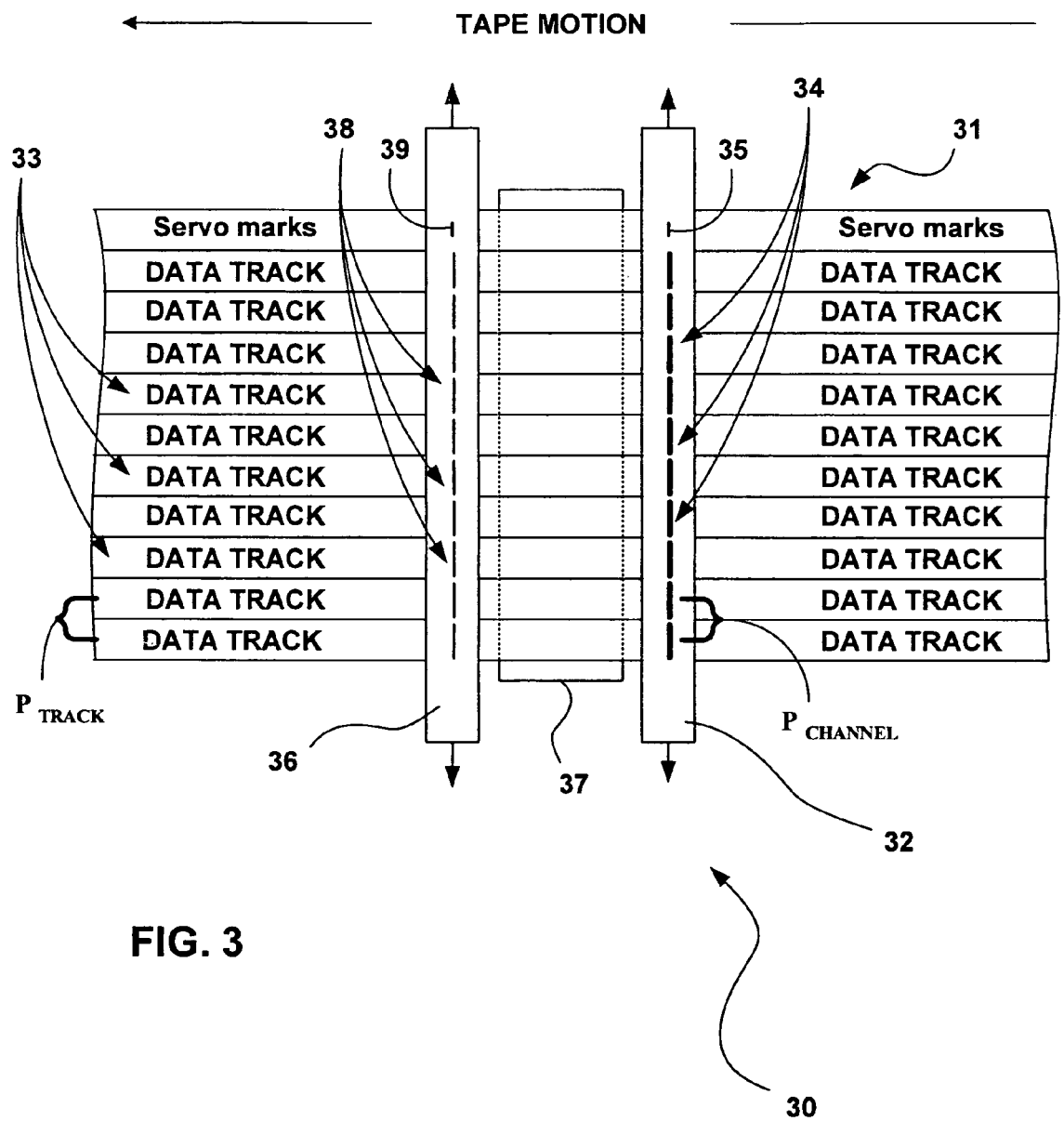
FIG. 3 is another conceptual diagram illustrating a read-while-write system that includes separate sliders for a plurality of read elements and a plurality of write elements and a guide between the separate sliders.

FIG. 3 is another conceptual diagram illustrating a read-while-write system 30 that includes separate sliders for a plurality of read elements and a plurality of write elements. In particular, a first slider 32 includes a plurality of write elements 34 and a servo element 35, whereas a second slider 36 includes a plurality of read elements 38 and a servo element 39. As magnetic tape 31 moves past sliders 32, 36 from right-to-left, write elements 34 write data into data tracks 33 of magnetic tape 31, e.g., as magnetic transitions. Read elements 38 of second slider 36 read the data written by write elements 34 in order to verify the accuracy and integrity of the data. If data is not properly recorded, one of read elements 38 can detect the inaccurate data and the corresponding one of write elements 34 can re-write the data again. In this manner, system 30 provides read-while-write functionality. Read-while-write functionality generally refers to the read-out verification of data as it is written. The described invention facilitates such read-while-write functionality at unconventionally small track pitches. The use of separate sliders may also increase the number of available channels, and possibly reduce slider mass, which is advantageous for actuator-induced motion of the sliders.

In the embodiment of FIG. 3, each of read elements 38 of slider 36 corresponds to one of write elements 34 of slider 32. In this manner, the read and write elements define pairs that correspond to each of data tracks 33. The distance between adjacent read elements 38 or adjacent write elements 34 defines the channel pitch of system 30. The channel pitch is labeled "$P_{CHANNEL}$" in FIG. 3. The distance between adjacent tracks 33 of magnetic tape 31 is refereed to as the track pitch of medium 31. The track pitch is labeled "$P_{TRACK}$" in FIG. 3. In the illustrated embodiment, the channel pitch and track pitch are identical, although this is not typically the case. In most cases, the channel pitch may be much larger than the track pitch, with adjacent tracks being defined by lateral motion of the respective slider by an amount corresponding to the track pitch, which is typically much less than the channel pitch.

First slider 32 and second slider 36 are separately controllable by different actuators (not shown in FIG. 3). In particular, first slider 32 can be controlled in response to servo signals detected by servo element 35, whereas second slider 36 can be controlled in response to servo signals detected by servo element 39. Such separate control of the positioning of write elements 34 and read elements 38 can improve head to track alignment. In particular, with separate positioning control, write elements 34 and read element 38 can be positioned more accurately with respect to data tracks 33. As mentioned, separate positioning control can also simplify the creation of a read-while-write system by avoiding the need to precisely align read heads with write heads on a given slider, as is the case for system 10 of FIG. 1. For very small data tracks, e.g., track pitches less than 5 micron, less than 2 microns, and particularly less than 1 micron, the use of separate positioning control becomes very important. At these track pitches, element alignment as shown in FIG. 1 becomes difficult or impossible, particularly for sliders being mass produced.

System 30 includes guide 37 between sliders 32 and 36 to guide medium 31 past sliders 32, 36. Like the embodiment illustrated in FIG. 2, guide 37 in FIG. 3 may be located on an opposing side of medium 31 relative to sliders 32 and 36, which can also help define the proper contact tension between sliders 32, 36 and medium 31. Again, by implementing guide 37 between sliders 32, 36, the performance of system 30 can be improved by better isolating medium 31 with respect to sliders 32, 36 such that motion of one slider does not substantially undermine the position of the medium 31 with respect to the other slider.

Figure 4:
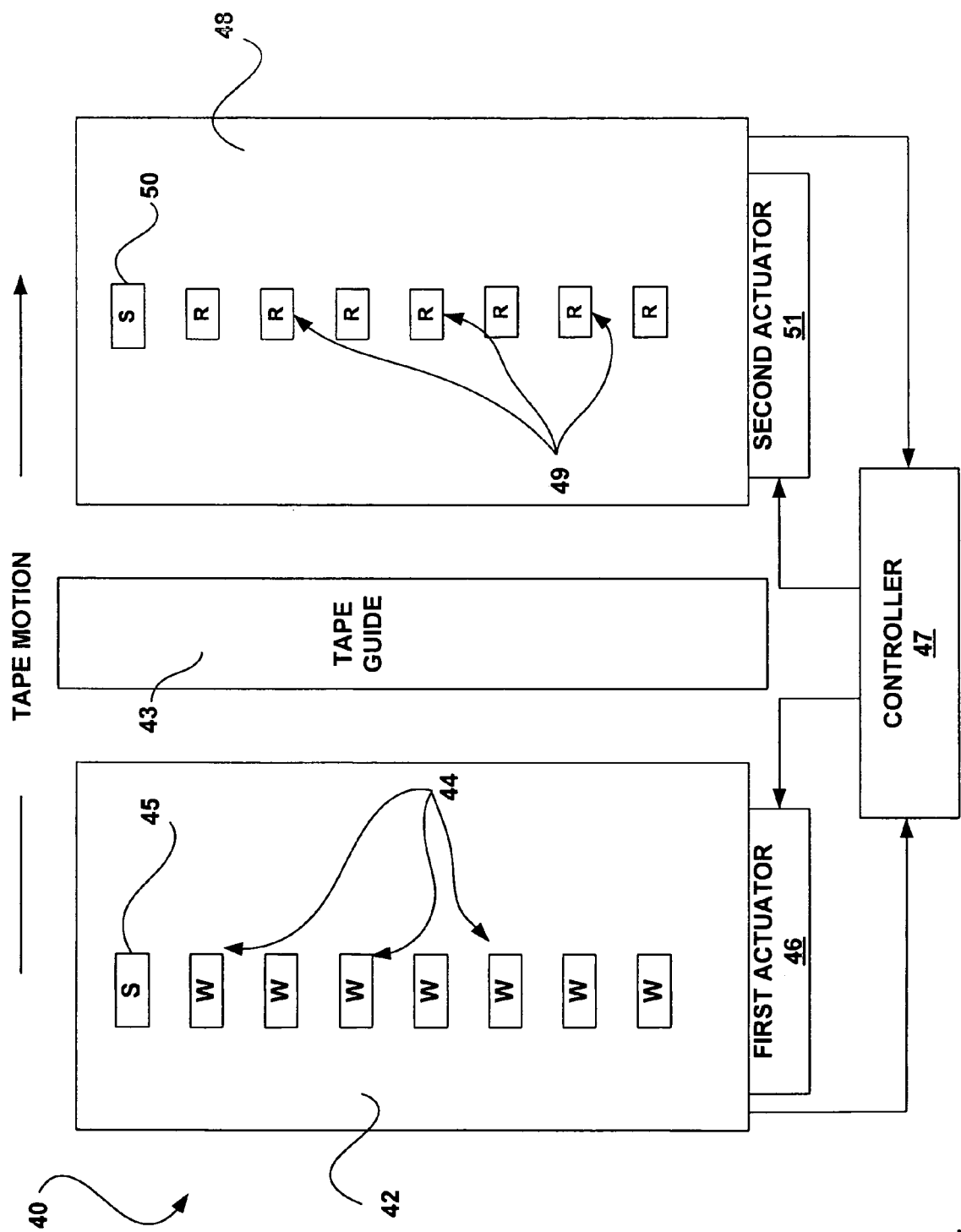
FIG. 4 is a block diagram illustrating a read-while-write system according to an embodiment of the invention.

FIG. 4 is a block diagram illustrating a read-while-write system 40 according to an embodiment of the invention. System 40 includes a first slider 42 including one or more write elements 44 to write data to a linear data storage medium, and a servo element 45 to read servo marks from the linear data storage medium. A first actuator 46 defines positioning of first slider 42. Controller 47 may receive detected servo signals from servo element 45 and control first actuator 46 based on the detected servo signals.

System 40 also includes a second slider 48 including one or more read elements 49 to read the data written by the write elements 44 of first slider 42. Second slider 48 also includes a servo element 50 to read the servo marks from the linear data storage medium. A second actuator 51 defines positioning of second slider 48. Controller 47 may receive detected servo signals from servo element 50 and control second actuator 51 based on such servo signals. In this manner, sliders 42 and 48 are independently controlled based on servo signals detected by the respective sliders. Again, this avoids problems and limitations of conventional sliders that have write elements and read elements aligned on the slider for each channel.

System 40 also includes tape guide 43 between sliders 42 and 48 to guide the tape past sliders 42, 48, and to isolate the tape with respect to sliders 42, 48 such that motion of one slider does not substantially affect the position of the tape with respect to the other slider.

Read element 49 and write elements 44 may comprise magnetic heads that define magnetic gaps for readout or recording, respectively. A wide variety of such heads have been developed read and/or write functionality, including magneto-resistive (MR) heads, giant magneto-resistive (gMR) heads, inductive heads, thin film heads, C-core heads that include an excitation coil around the C-core, and a wide variety of other types of heads. Servo elements 45 and 50 may comprise similar magnetic heads, but are sized and/or patterned with gaps specific for servo detection. The size and shape of magnetic gaps used to for servo elements 45, 50 will depend on the type of servo pattern used for the medium. A wide variety of time based and amplitude based servo patterns have been developed, and each pattern defines a specific head structure used for servo readout.

The actuators described herein may be any type of actuators, including voice coil actuators, piezoelectric actuators, or any other positioning element. In some cases, each actuator may include both fine and coarse positioning elements, e.g., a stepper motor for coarse positioning and a voice coil for fine positioning. In still other embodiments, a common coarse positioning element may be used for both sliders 42 and 48, with different fine positioning elements being used for the different sliders 42 and 48. In that case, actuators 46 and 51 may be the fine positioning elements for the respective sliders that share a coarse positioning element.

Figure 5:
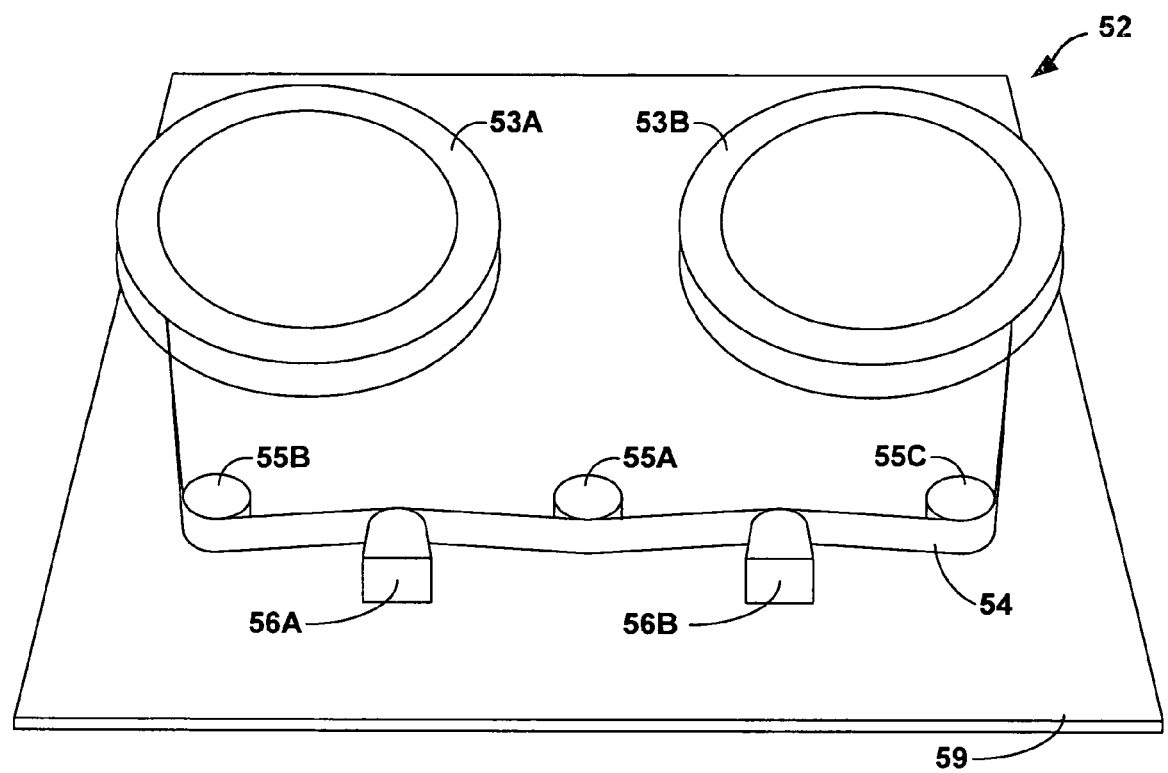
FIG. 5 is a perspective view illustrating a read-while-write system according to an embodiment of the invention.

FIG. 5 is a perspective view of system 52 in which magnetic tape 54 feeds from a first spool 53A to a second spool 53B. Spools 53A and 53B may comprise large magnetic tape spools, or possibly smaller spools housed within a tape cartridge. In any case, magnetic tape 54 feeds over a set of guides 55A, 55B and 55C and comes into contact with sliders 56A and 56B. As described herein, sliders 56A and 56B are separately positioned by different actuators, and guide 55A between sliders 56A and 56B helps to isolate magnetic tape 54 such that lateral motion of one of sliders 56A or 56B does not move magnetic tape 54 in a manner that undermines the position of the other one of sliders 56A or 56B with respect to magnetic tape 54. Sliders 56A, 56B and the respective actuators that position sliders 56A, 56B may each be mounted on shock mounts rather than being directly mounted to baseplate 59, which can reduce the transfer of force through baseplate 59, and otherwise limit unintended motion of the respective sliders.

Figure 6:
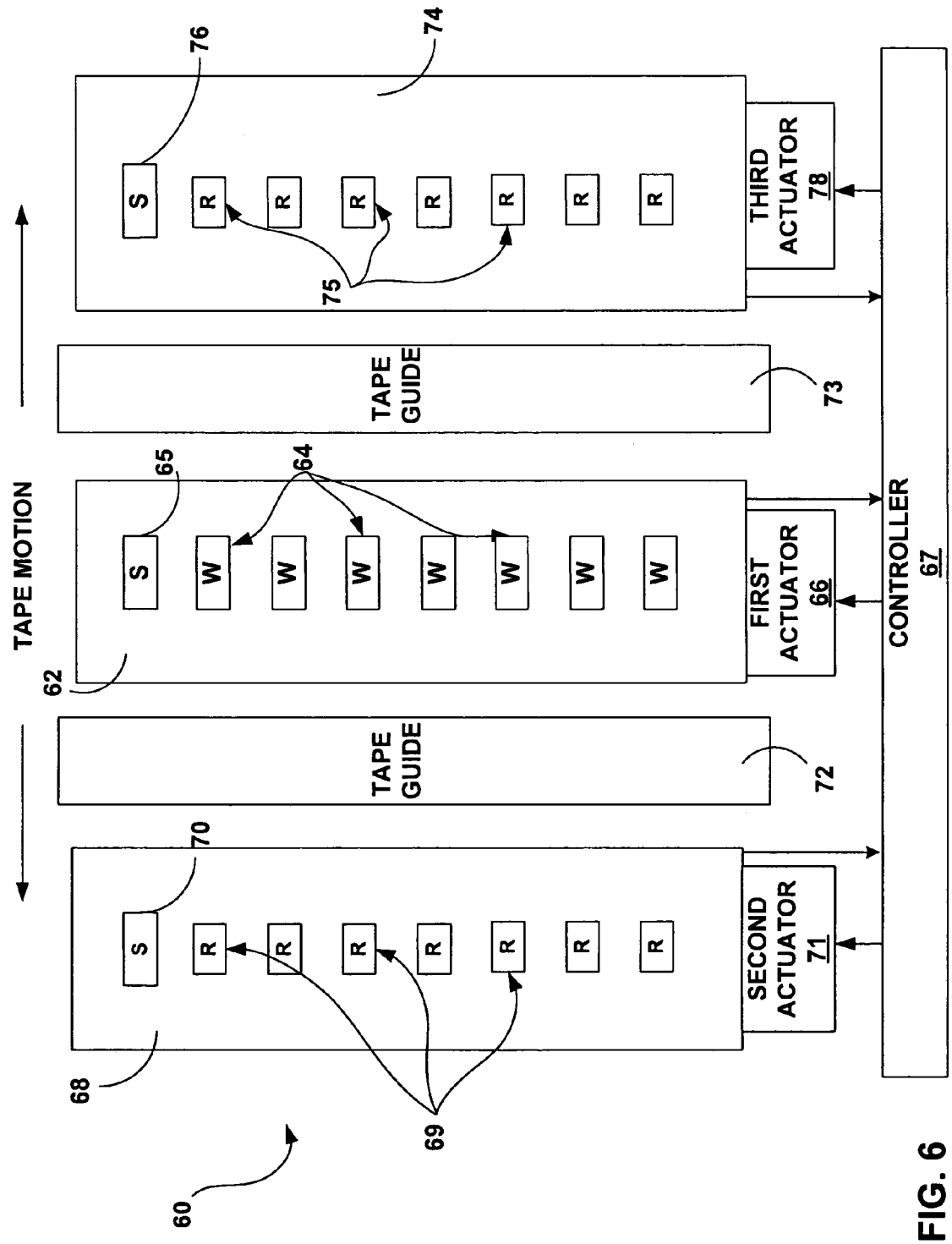
FIGS. 6 and 7 are block diagrams illustrating read-while-write systems according to embodiments of the invention.

FIG. 6 is a block diagram illustrating a bi-directional read-while-write system 60 according to an embodiment of the invention. System 60 is similar to system 40 of FIG. 4, but includes an additional slider having read elements. Guides are implemented between each of the sliders.

System 60 includes a first slider 62 including one or more write elements 64 to write data to a linear data storage medium, and a servo element 65 to read servo marks from the linear data storage medium. A first actuator 66 defines positioning of first slider 62. Controller 67 may receive detected servo signals from servo element 65 and control first actuator 66 based on such servo signals.

System 60 also includes a second slider 68 including one or more read elements 69 to read the data written by the write elements 64 of first slider 62 when the magnetic tape moves right-to-left. Second slider 68 also includes a servo element 70 to read the servo marks from the linear data storage medium. A second actuator 71 defines positioning of second slider 68. Controller 67 may receive detected servo signals from servo element 69 and control second actuator 71 based on such servo signals. In this manner, sliders 62 and 68 are independently controlled based on servo signals detected by the respective sliders. Again, this avoids problems and limitations of conventional sliders that have write elements and read elements aligned for each channel. A first tape guide 72 is implemented between sliders 62 and 68.

System 60 also includes a third slider 74 including one or more read elements 75 to read the data written by the write elements 64 of first slider 62 when the magnetic tape moves left-to-right. Third slider 74 also includes a servo element 76 to read the servo marks from the linear data storage medium, providing for independent servo control of third slider 74. A third actuator 78 defines positioning of third slider 74. Controller 67 may receive detected servo signals from servo element 75 and control third actuator 78 based on such servo signals. A second tape guide 73 is implemented between sliders 68 and 74.

In the embodiment of FIG. 5, write elements 64 of first slider 62 can be used to write data in both directions. Read elements 69 of second slider 68 read and verify data in a first tape direction, whereas read elements 75 of third slider 74 read and verify data in a second tape direction. In this manner, system 60 allows for bi-directional read-while-write functionality with improved head-to-track positioning. Tape guides 72 and 73 improve system 60 by isolating the magnetic tape with respect to the different sliders.

Figure 7:
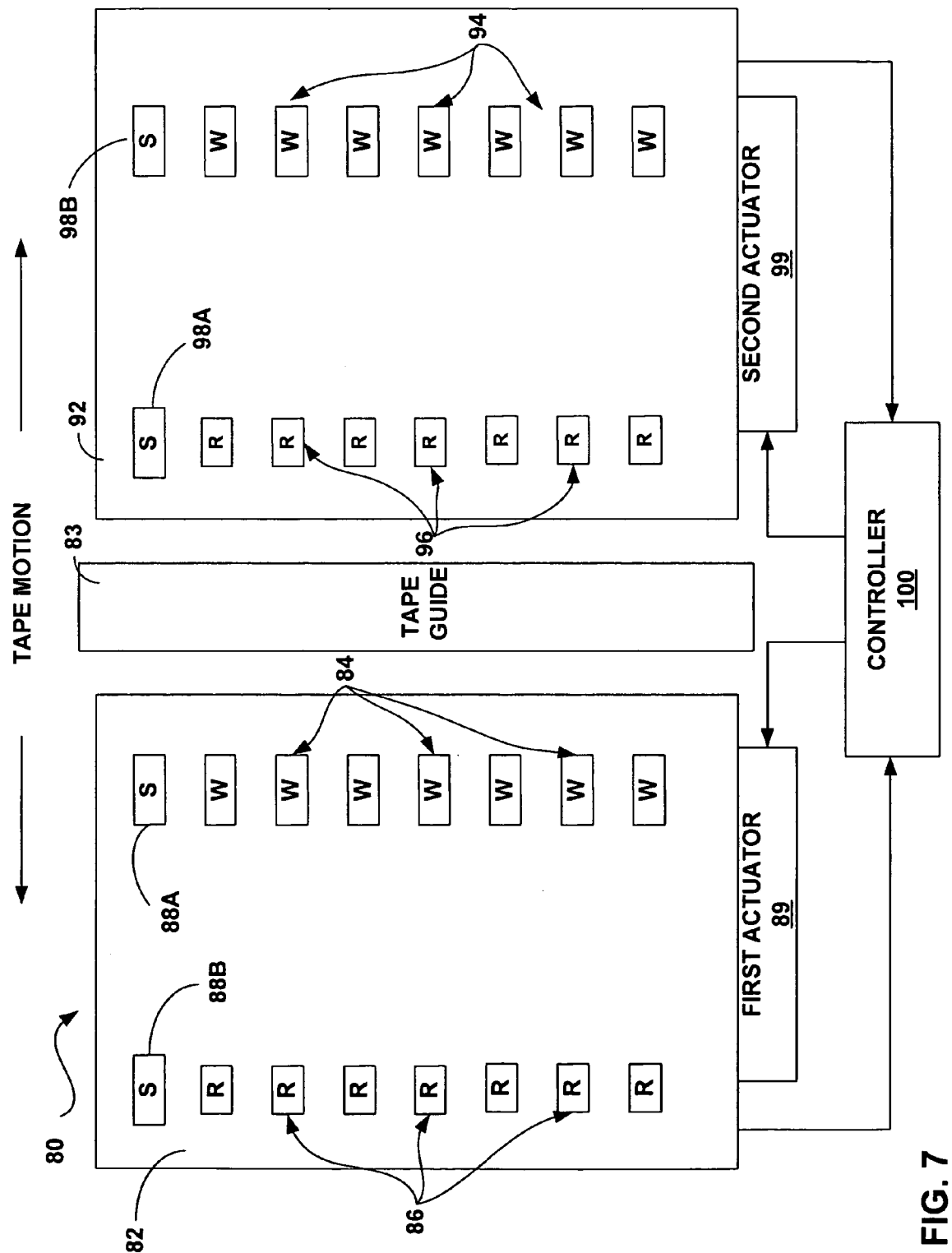

FIG. 7 is a diagram illustrating another read-while-write system according to an embodiment of the invention. System 80 of FIG. 7 includes a first slider 82 including one or more first write elements 84 to write data to the magnetic tape in a first tape direction, one or more first read elements 86 to read data from the magnetic tape in a second tape direction, and a first servo element 88A to read servo marks from the magnetic tape. System 80 also includes a first actuator 89 to define positioning of first slider 80. In the embodiment of FIG. 7, servo elements 88A and 88B are illustrated, although only one servo element is actually needed for a given slider. Either of servo elements 88A, 88B or both of servo elements 88A, 88B could be used. Typically, servo element 88A is used with write elements 84 and servo element 88B is used with read elements 86.

System 80 also includes a second slider 92 including one or more second write elements 94 to write data to the magnetic tape in the second tape direction, one or more second read elements 96 to read data from the magnetic tape in the first tape direction, and a second servo element 98A to read servo marks from the magnetic tape. System 80 also includes a second actuator 99 to define positioning of second slider 92. In the illustrated embodiment, servo elements 98A and 98B are shown, although only one servo element is actually needed for slider 92. Typically both servo elements 98A and 98B are used, depending on whether writing or reading is being performed by the slider. For example, servo element 98A is typically used with read elements 96 and servo element 98B is typically used with write elements 94.

In accordance with the invention, first actuator 89 positions first slider 82 in response to servo signals detected by first servo element 88A. Similarly, second actuator 99 positions second slider 92 in response to servo signals detected by second servo element 98A. However, in a first tape direction, write elements 84 of first slider 82 are used in conjunction with the read elements 96 of second slider 92 for read-while-write verification. In particularly, read elements 96 of second slider 92 provide verification of data recorded by write elements 84 of first slider 82. Similarly, in a second tape direction, write elements 94 of second slider 92 are used in conjunction with the read elements 86 of first slider 82 for read-while-write verification. Accordingly, the read and write elements used during any given operation are independently controlled by different actuators, e.g., in response to different servo signals. Controller 100 receives servo signals detected by one of the servo elements of first slider 82 and second slider 92, and sends appropriate control signals to actuators 89, 99 to properly position the heads for read-while-write operations.

System 80 also includes tape guide 83 between sliders 82 and 92 to guide the tape past sliders 82, 92, and to isolate the tape with respect to sliders 82, 92 such that motion of one slider does not substantially undermine the position of the tape with respect to the other slider.

As described herein, because the read and write elements used during any given operation are independently controlled by different actuators, improved track pitch can be facilitated, e.g. track pitches less than 5 microns, less than 2 microns, or even less than 1 micron. Moreover, the system of FIG. 7 provides additional advantages in terms of slider fabrication. Sliders 82 and 92 may be fabricated in a manner similar to conventional sliders, such as slider 12 of FIG. 1. Many distinct fabrication advantages can be realized by using conventional sliders. However, in contrast to conventional systems, system 80 of FIG. 7 makes use of two sliders, and a given set of write elements of a given slider are not used with the read elements of that slider. Instead, the write elements 84 of first slider 82 are used in conjunction with the read elements 96 of second slider 92 in a first tape direction for read-while-write operation, whereas the write elements 94 of second slider 92 are used in conjunction with the read elements 86 of first slider 82 for read-while-write verification in a second tape direction.

Figure 8:
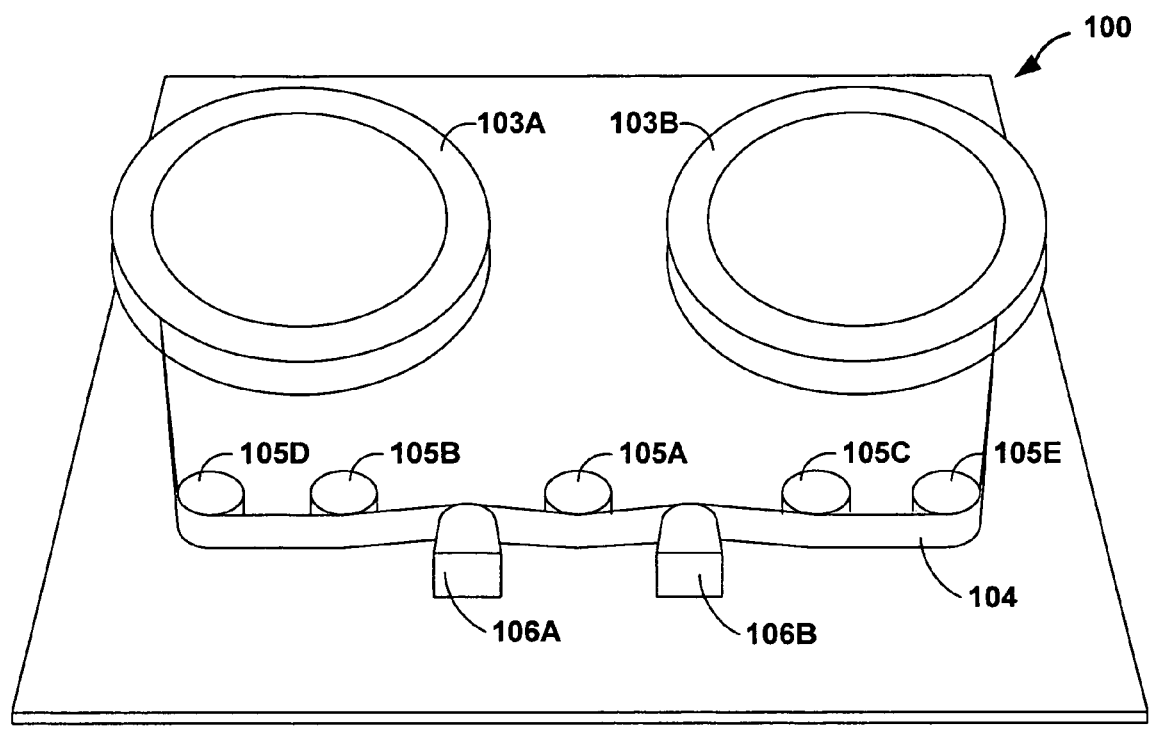
FIG. 8 is another perspective view illustrating a read-while-write system according to an embodiment of the invention.

FIG. 8 is another perspective view of system 100 in which magnetic tape 104 feeds from a first spool 103A to a second spool 103B. Spools 103A and 103B may comprise large magnetic tape spools, or possibly smaller spools housed within a tape cartridge. In any case, magnetic tape 104 feeds over a set of guides 105A–105F and comes into contact with sliders 106A and 106B. As described herein, sliders 106A and 106B are separately positioned by different actuators, and guide 105A between sliders 106A and 106B helps to isolate magnetic tape 104 such that lateral motion of one of sliders 106A or 106B does not move magnetic tape 104 in a manner that substantially affects the position of the other one of sliders 106A or 106B with respect to magnetic tape 104. Moreover the layout and arrangement of guides 105B–105F may also improve system performance. Various guide layouts and arrangements are explained below with reference to FIGS. 9–12.

Figure 9:
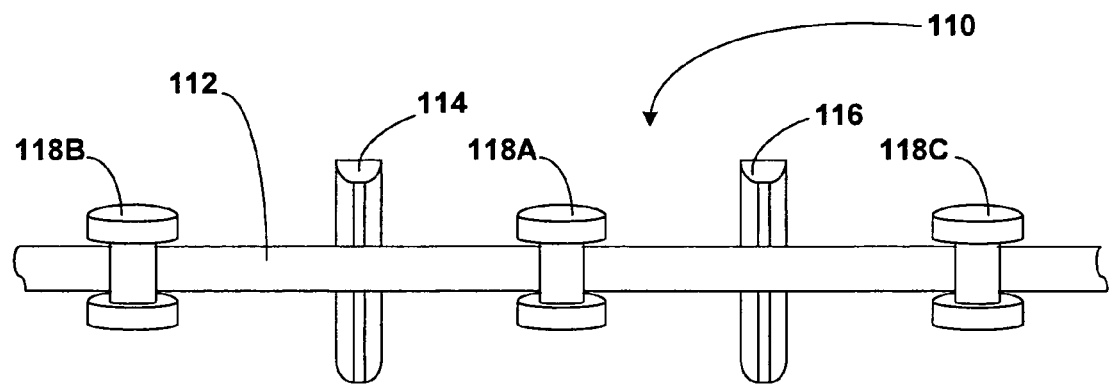
FIGS. 9–12 are additional perspective views illustrating various read-while-write systems according to embodiments of the invention.

FIG. 9 is a perspective view illustrating a read-while-write system 110 comprising magnetic tape 112 passing over a first slider 114 and a second slider 116, which are separately controlled and positioned by different actuators as outlined herein. A first tape guide 118A is positioned between sliders 114, 116 on an opposing side of magnetic tape 112 relative to sliders 114, 116. A second tape guide 118B is positioned before slider 114 along the tape path in a direction of motion of magnetic tape 112, while a third tape guide 118C is positioned after slider 116 along the tape path in the direction of motion of magnetic tape 112. In this manner, a set of guides 118A–18C (collectively guides 118) generally define the tape path of magnetic tape 112 as it feeds through system 110. Again, sliders 114, 116 are separately positioned by different actuators (not shown).

Each of guides 118 may comprise a generally cylindrical shaped center which forms a tape path surface and disk-shaped flanges adjacent to the cylindrical center. The flanges define edges that limit lateral motion of magnetic tape 112 as it feeds through system 110. Other shaped guides, however, could also be used including guides without flanges. Guides 118 may comprise polished steel or any other material. Guides 118 may comprise hydrodynamic air bearing guides, in which case magnetic tape 112 "flies" over the tape path surfaces of guides 118 and the motion of magnetic tape 112 creates an air barrier between guides 118 and magnetic tape 112. Alternatively, guides 118 may comprise hydrostatic air bearing guides, in which case magnetic tape 112 "flies" over guides 118, but the air is introduced by an external source to create the air barrier between guides 118 and magnetic tape 112. In still other examples, guides 118 may comprise roller bearings, in which case, the tape path surfaces of guides 118 comprise rollers that roll with magnetic tape 112 as magnetic tape 112 feeds over guides 118. Slight modifications to the guide arrangement illustrated in FIG. 9 may further improve system performance. Such modifications are better illustrated in FIGS. 10–12.

Figure 10:
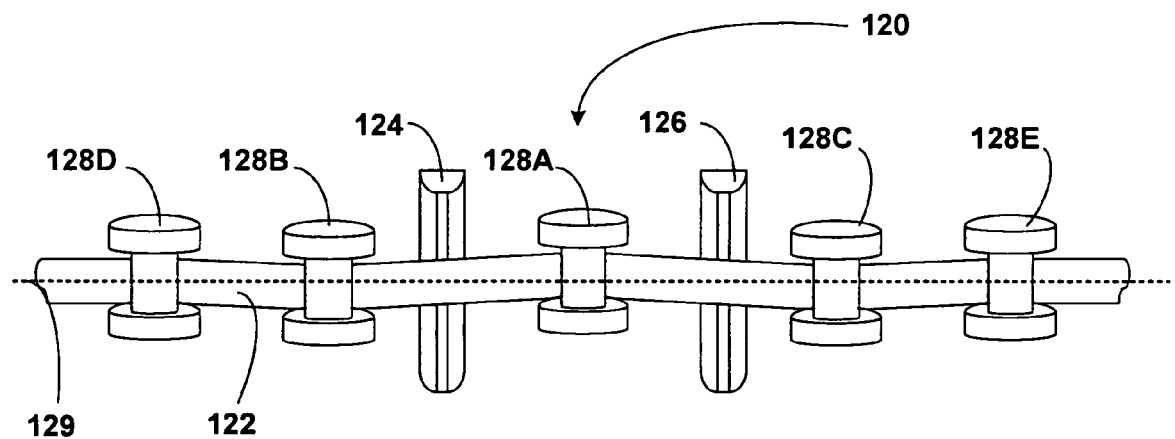

FIG. 10 is another perspective view illustrating a read-while-write system 120 comprising magnetic tape 122 passing over a first slider 124 and a second slider 126, which are separately controlled and positioned by different actuators as outlined herein. A first tape guide 128A is positioned between sliders 124, 126 on an opposing side of magnetic tape 122 relative to sliders 124, 126. A second tape guide 128B is positioned before slider 124 along the tape path in the direction of motion of magnetic tape 122, while a third tape guide 128C is positioned after slider 126 along the tape path in the direction of motion of magnetic tape 122. Additional tape guides 128D and 128E are also shown. The set of guides 128A–128E (collectively guides 128) generally define the tape path of magnetic tape 122 as it feeds through system 120.

Also illustrated in FIG. 10 is a centerline 129, which defines a center of the tape path surfaces of guides 128D and 128E. Second and third guides 128B and 128C are offset relative to first guide 128A to create a shear force in the linear data storage medium as the linear data storage medium feeds through the system. More specifically, second and third guides 128B and 128C may be offset downward with respect to centerline 129 by a distance of approximately 0.0005 inches (0.00127 cm), while first guide 128 may be offset upward with respect to centerline 129 by a distance of approximately 0.0005 inches (0.00127 cm). This creates a shear force in magnetic tape 122 over sliders 124 and 126. Also, the lateral distance between the bottom flange of first tape guide 128A, and the top flanges of tape guides 128B and 128C may be less than a width of magnetic tape 122.

Moreover, to further improve stability, the distance between first guide 128A and second guide 128B along the tape path, and the distance between first guide 128A and third guide 128C along the tape path may each be less than 2 multiplied by the width of magnetic tape 122. In some cases, each of tape guides 128 may define a tape path surface between the upper flange and lower flange having a width less than approximately 0.001 inch (0.0000254 cm) greater than a width of magnetic tape 122. These features can also improve tape guiding, which is particularly necessary when magnetic tape 122 defines very small track pitches.

Figure 11:
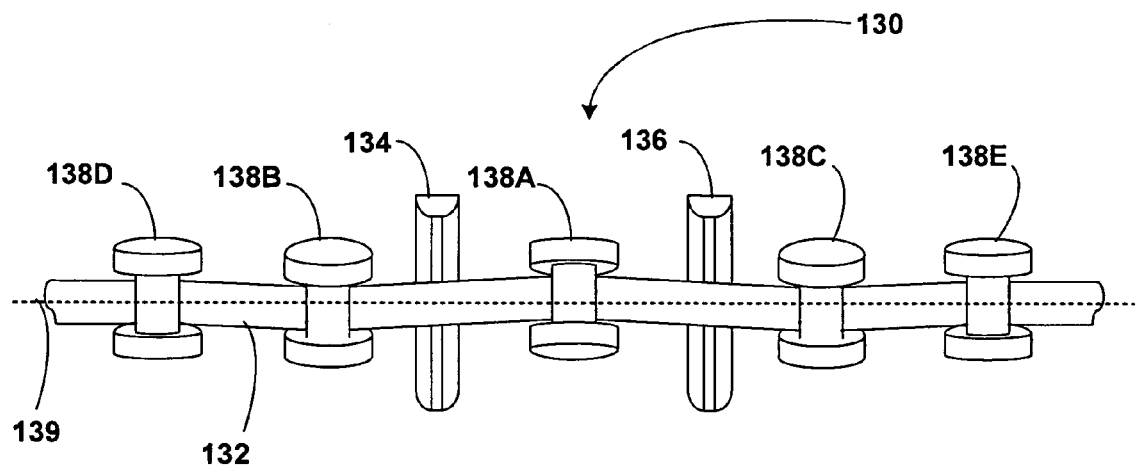

FIG. 11 is a perspective view illustrating another read-while-write system 130 comprising magnetic tape 132 passing over a first slider 134 and a second slider 136, which are separately controlled and positioned by different actuators as outlined herein. A first tape guide 138A is positioned between sliders 134, 136 on an opposing side of magnetic tape 132 relative to sliders 134, 136. A second tape guide 138B is positioned before slider 134 along the tape path in the direction of motion of magnetic tape 132, while a third tape guide 138C is positioned after slider 136 along the tape path in the direction of motion of magnetic tape 132. Additional tape guides 138D and 138E are also shown. The set guides 138A–138E (collectively guides 138) generally define the tape path of magnetic tape 132 as it feeds through system 130.

In system 130, tape path surfaces of second and third guides 138B and 138C are tilted relative to a tape path surface of the first guide 138A. Tape guides 138D and 138E may define non-tilted tape paths of 0 degrees. Second and third tape guides 138B and 138C may be tilted downward by an angular distance of approximately 0.4 degrees, while first guide 138A may be tilted upward an angular distance of approximately 0.4 degrees. As shown, the tilted tape guides may cause the magnetic tape 132 to follow a path that deviates slightly from a linear centerline 139.

Figure 12:
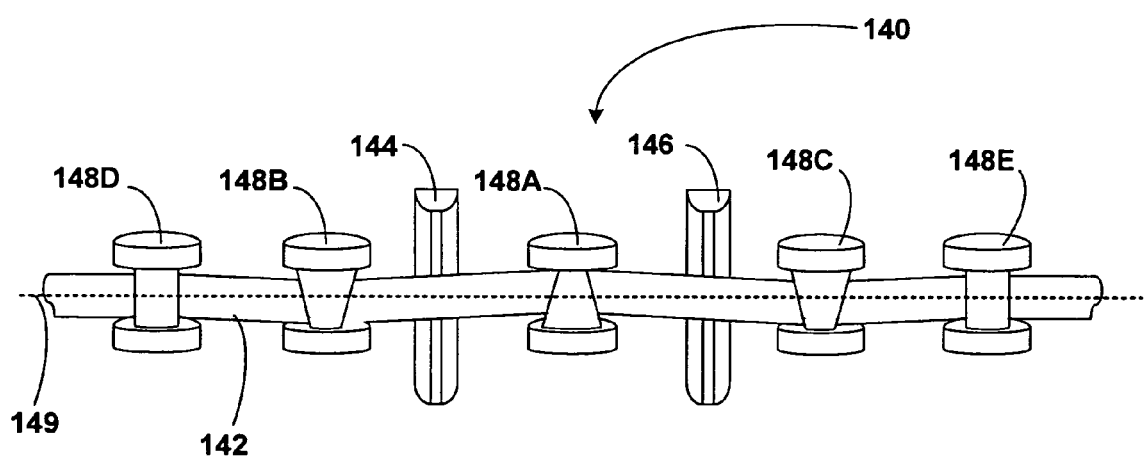

FIG. 12 is a perspective view illustrating another read-while-write system 140 comprising magnetic tape 142 passing over a first slider 144 and a second slider 146, which are separately controlled and positioned by different actuators as outlined herein. A first tape guide 148A is positioned between sliders 144, 146 on an opposing side of magnetic tape 142 relative to sliders 144, 146. A second tape guide 148B is positioned before slider 144 along the tape path in the direction of motion of magnetic tape 142, while a third tape guide 148C is positioned after slider 146 along the tape path in the direction of motion of magnetic tape 142. Additional tape guides 148D and 148E are also shown. The set guides 148A–148E (collectively guides 148) generally define the tape path of magnetic tape 142 as it feeds through system 140.

In system 140, the first, second and third guides 148A–148C define tapered tape path surfaces, the tapered tape path surfaces in the second and third guides 143B and 143C may be tapered in a direction opposite that of the tapered tape path surface in first guide 148A. By way of example, the tapers may define angular distances of approximately positive and negative 0.4 degrees relative to a non-tapered tape path surface of guides 148D and 148E in which the tape path surfaces are perpendicular to the flanges of the guides. As shown, the tapered tape guides may cause the magnetic tape 142 to follow a path that deviates slightly from a linear centerline 149.

Figure 13:
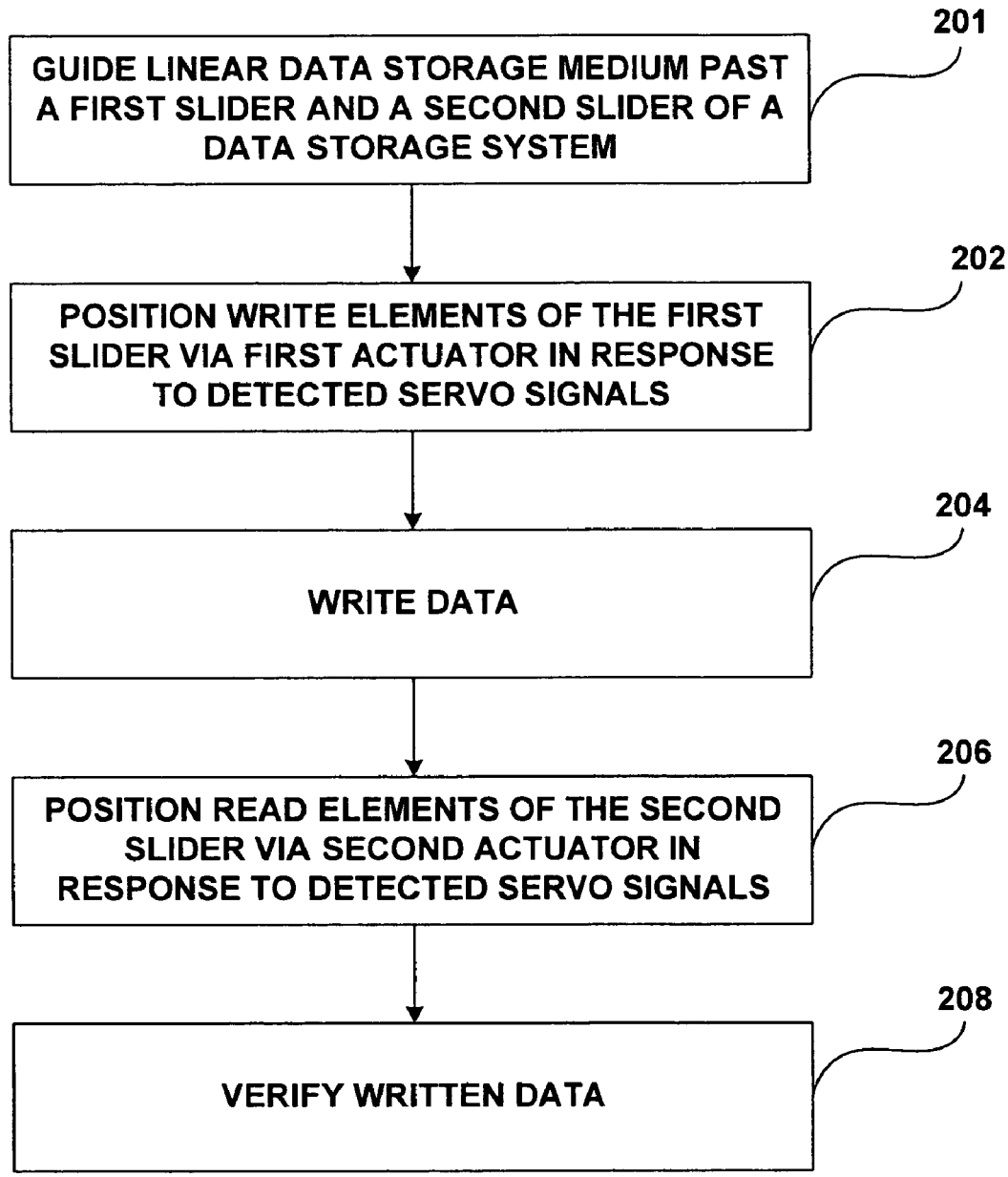
FIG. 13 is a flow diagram illustrating a technique according to an embodiment of the invention.

FIG. 13 is a flow diagram illustrating a technique according to an embodiment of the invention. FIG. 13 will be described with reference to system 80 of FIG. 7. As shown, a set of guides guide a linear data storage medium past a first slider 82 and a second slider 92 of system 80 (201). The set of guides include guide 83 that is positioned between sliders 82 and 92. Controller 100 positions write elements 84 of first slider 82 via first actuator 89 in response to servo signals detected by servo element 88A and/or 88B (202). Write elements 84 can then properly write data to data tracks of the data storage media passing slider 82 (204). Controller 100 also positions read elements 96 of second slider 92 via actuator 99 in response to servo signals detected by servo element 98A and/or 98B (206). Read elements 96 can then properly read data written to the data tracks of the data storage media (208). In this manner, separate actuators can be used to position write elements and read elements for read-while-write operations. A similar technique is performed for the opposite tape direction, but read elements 86 of slider 82 are used in conjunction with write elements 94 of slider 92. In either case, tape guide 83 improves the performance of system 80 by better isolating the linear data storage medium with respect to sliders 82, 92 such that lateral motion of one slider to position that slider does not substantially undermine the position of the medium with respect to the other slider, and vice versa.

Figure 14:
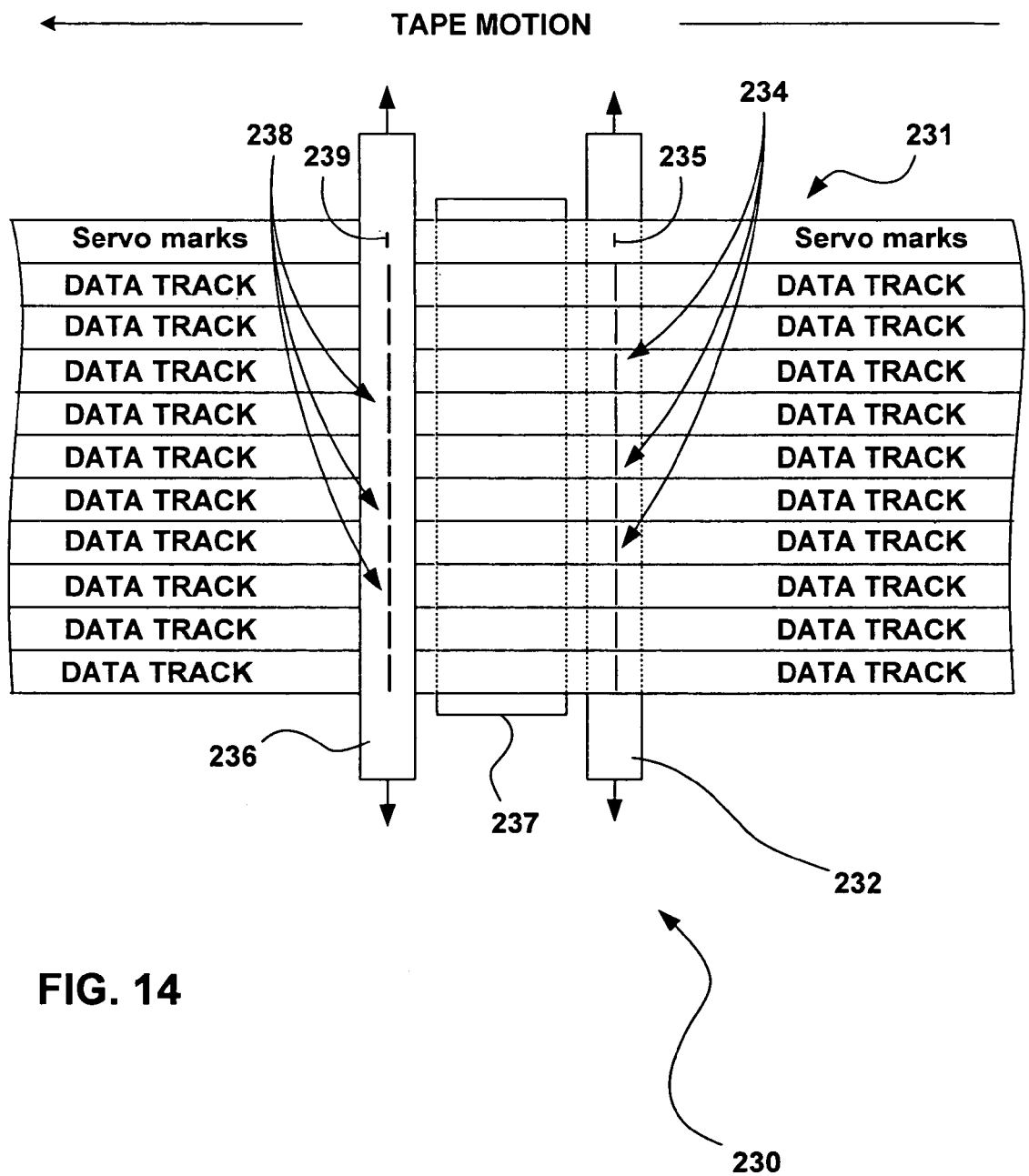
FIG. 14 is a conceptual diagram illustrating a system that includes separate sliders for on opposing sides of a two-sided medium and a guide between the separate sliders.

FIG. 14 is a conceptual diagram illustrating an added embodiment of a system 230 that includes separate sliders for opposing sides of a two-sided medium, and a guide between the separate sliders to reduce potential cross-feed motion of magnetic tape 231. Magnetic tape 231 is recorded with data on both sides. In general, the concepts outlined above with respect to read-while-write recording on one side of magnetic tape may also be applied to such dual-sided magnetic tape to limit affects of one slider with respect to another slider positioned on an opposing side of the medium. As shown conceptually, a first slider 232 is positioned on a first side of magnetic tape 231 and includes a plurality of elements 234 and a first servo element 235. Elements 234 may comprise write elements for writing to magnetic tape 231 or read elements for reading data from magnetic tape 231. Additional elements may also be included on first slider 232 to facilitate read-while-write with respect to the first side of magnetic tape 231.

A second slider 236 is positioned on the opposing side of magnetic tape 231 and includes a second plurality of elements 238 and a second servo element 239. Additional elements may also be included on second slider 236 to facilitate read-while-write with respect to the second side of magnetic tape 231. In any case, as magnetic tape 231 moves past sliders 232, 236 from right-to-left, elements 234 write or read data with respect to a first side of magnetic tape 231, and at the same time, elements 238 of second slider 236 read or write data with respect to a second side of magnetic tape. Guide 237 may be positioned on either side of magnetic tape 231 and may limit cross-feed motion of magnetic tape 231 that is otherwise caused by motion of the respective sliders on opposing sides of tape 231. In some cases, the dual-sided system of FIG. 14 may also implement read-while-write sliders on both sides of magnetic tape 231. Moreover, in some cases, separate read and write sliders may be included on both sides of magnetic tape 231.

A number of embodiments of the invention have been described. For example, various embodiments of read-while-write recording systems for a linear data storage medium have been described. These and other embodiments are within the scope of the following claims.

The invention claimed is:

1. A read-while-write recording system for a linear data storage medium comprising:
   a first slider including a write element to write data to the linear data storage medium and a first servo element to read servo marks from the linear data storage medium;
   a first actuator to define positioning of the first slider;
   a second slider including a read element to read the data written by the write element, and a second servo element to read the servo marks from the linear data storage medium;
   a second actuator to define positioning of the second slider; and
   a guide between the first slider and the second slider,
   wherein the first actuator positions the first slider in response to servo signals detected by the first servo element and the second actuator positions the second slider in response to servo signals detected by the second servo element, and wherein the guide reduces motion of the linear data storage medium with respect to the first slider when the second slider is positioned by the second actuator and reduces motion of the linear data storage medium with respect to the second slider when the first slider is positioned by the first actuator.

2. The system of claim 1, further comprising a controller to receive the servo signals detected by the first and second servo elements and to control the actuators based on the servo signals.

3. The system of claim 1, wherein a track pitch of the linear data storage medium is less than approximately 5 microns.

4. The system of claim 1, wherein the guide comprises a first guide, the system further comprising:
   a third slider including a read element to read the data written by the write element and a third servo element to read the servo marks from the linear data storage medium;
   a third actuator to define positioning of the third slider; and
   a second guide between the first slider and the third slider,
   wherein the write element of the first slider and the read element of the second slider perform read-while-write functions in a first tape direction and the write element of the first slider and the read element of the third slider perform read-while-write functions in a second tape direction.

5. The system of claim 1, wherein:
   the first slider includes a plurality of write elements; and
   the second slider includes a plurality of read elements.

6. The system of claim 5, wherein a number of write elements of the first slider corresponds to a number of read elements of the second slider such that the read elements verify data written by the write elements.

7. The system of claim 5, wherein adjacent write elements on the first slider define a channel pitch and adjacent read elements of the second slider are spaced from one another according to the channel pitch.

8. The system of claim 1, wherein the linear data storage medium includes data recorded on both sides of the medium and wherein the first and second sliders are positioned on opposing sides of the linear data storage medium.

9. The system of claim 1, wherein the linear data storage medium comprises magnetic data storage tape.

10. The system of claim 1, further comprising a set of guides to guide the linear data storage medium through the system, the set of guides including:
    the guide between the first slider and the second slider, the guide between the first slider and the second slider being a first guide;
    a second guide before the first slider in a direction of motion of the linear data storage medium; and
    a third guide after the second slider in the direction of motion of the linear data storage medium.

11. The system of claim 10, wherein the second and third guides are offset relative to the first guide to create a shear force in the linear data storage medium as the linear data storage medium feeds through the system.

12. The system of claim 10, wherein tape path surfaces of the second and third guides are tilted relative to a tape path surface of the first guide.

13. The system of claim 10, wherein the first second and third guides define tapered tape path surfaces, the tapered tape path surfaces in the second and third guides being tapered in a direction opposite that of the tapered tape path surface in the first guide.

14. A read-while-write recording system for magnetic data storage tape comprising:
    a first slider including a first write element to write data to the magnetic tape in a first tape direction, a first read element to read data from the magnetic tape in, a second tape direction, and a first servo element to read servo marks from the magnetic tape;
    a first actuator to define positioning of the first slider;
    a second slider including a second write element to write data to the magnetic tape in the second tape direction, a second read element to read data from the magnetic tape in the first tape direction, and a second servo element to read servo marks from the magnetic tape;

a second actuator to define positioning of the second slider; and a guide between the first slider and the second slider;

wherein the first actuator positions the first slider in response to servo signals detected by the first servo element and the second actuator, positions the second slides in response to servo signals detected by the second servo element, and wherein the guide reduces motion of the linear data storage medium with respect to the first slider when the second slider is positioned by the second actuator and reduces motion of the linear data storage medium with respect to the second slider when the first slider is positioned by the first actuator.

15. The system of claim 14, wherein the first and second sliders each include a plurality of write elements and a plurality of read elements.

16. The system of claim 14, wherein a track pitch of the magnetic tape is less than approximately 2 microns.

17. A method comprising:

guiding a linear data storage medium through a set of guides past a write element on a first slider and a read element on a second slider, the set of guides including a guide between the first slider and the second slider;

writing data on the linear data storage medium via the write element on the first slider;

verifying the data on the linear data storage medium via the read element on the second slider;

positioning the write element of the first slider via a first actuator in response to servo signals detected by a first servo element on the first slider; and positioning the read element of the second slider via a second actuator in response to servo signals detected by a second servo element on the second slider, wherein the guide reduces motion of the linear data storage medium with respect to the first slider when the second slider is positioned by the second actuator and reduces motion of the linear data store medium with respect to the second slider when the first slider is positioned by the first actuator.

18. The method of claim 17, wherein a track pitch of the linear data storage medium is less tan approximately 5 microns.

19. A data recording system for a linear data storage medium comprising:

a first slider including a first set of elements to either write data or read data with respect to a first side of the linear data storage medium and a first servo element to read first servo marks from the first side of the linear data storage medium;

a first actuator to define positioning of the first slider;

a second slider including a second set of elements to either write data or read data with respect to a second side of the linear data storage medium, and a second servo element to read second servo marks from the second side of the linear data storage medium;

a second actuator to define positioning of the second slider; and a guide between the first slider and the second slider and positioned on either the first or second side of the data storage medium, wherein the first actuator positions the first slider in response to servo signals detected by the first servo element and the second actuator positions the second slider in response to servo signals detected by the second servo element, and wherein the guide reduces motion of the linear data storage medium with respect to the first slider when the second slider is positioned by the second actuator and reduces motion of the linear data storage medium with respect to the second slider when the first slider is positioned by the first actuator.

* * * * *